United States Patent
Kim

(10) Patent No.: US 7,317,986 B2
(45) Date of Patent: Jan. 8, 2008

(54) METHOD OF MAP VERSION MANAGEMENT FOR A CAR NAVIGATION SYSTEM

(75) Inventor: Hyoung Jin Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 322 days.

(21) Appl. No.: 10/882,840

(22) Filed: Jun. 30, 2004

(65) Prior Publication Data

US 2004/0267441 A1 Dec. 30, 2004

(30) Foreign Application Priority Data

Jun. 30, 2003 (KR) ...................... 10-2003-0043954

(51) Int. Cl.
*G01C 21/00* (2006.01)
(52) U.S. Cl. ...................... 701/214; 701/208; 701/210; 701/213; 340/995
(58) Field of Classification Search ................ 701/16, 701/200, 202, 213, 209; 707/5, 100, 120; 715/500, 515; 340/995
See application file for complete search history.

(56) References Cited

U.S. PATENT DOCUMENTS

| | | | |
|---|---|---|---|
| 6,330,453 B1 * | 12/2001 | Suzuki et al. ............... | 455/457 |
| 6,415,307 B2 * | 7/2002 | Jones et al. .................. | 715/525 |
| 6,507,872 B1 * | 1/2003 | Geshwind .................... | 709/236 |
| 6,662,101 B2 * | 12/2003 | Adachi ........................ | 701/201 |
| 6,664,924 B2 * | 12/2003 | Knockeart et al. ..... | 342/357.13 |
| 6,684,221 B1 * | 1/2004 | Rejndrup ................. | 707/104.1 |
| 7,143,091 B2 * | 11/2006 | Charnock et al. ............... | 707/5 |
| 7,162,526 B2 * | 1/2007 | Dutta et al. ................. | 709/229 |
| 2002/0169650 A1 * | 11/2002 | Dougherty et al. ............ | 705/8 |
| 2003/0004636 A1 * | 1/2003 | Adachi ........................ | 701/201 |
| 2003/0055555 A1 * | 3/2003 | Knockeart et al. .......... | 701/202 |
| 2004/0267441 A1 * | 12/2004 | Kim ........................... | 701/200 |

FOREIGN PATENT DOCUMENTS

| | | | |
|---|---|---|---|
| EP | 1102228 | * | 5/2001 |
| EP | 1102228 A2 | * | 5/2001 |
| EP | 1005627 B1 | * | 10/2003 |
| WO | WO 9909374 A2 | * | 2/1999 |

* cited by examiner

*Primary Examiner*—Cuong Nguyen
(74) *Attorney, Agent, or Firm*—Lee, Hong, Degerman, Kang & Schmadeka

(57) ABSTRACT

According to a car navigation system and a map version management method thereof, a version management method for a server having maps of different versions and a car navigation apparatus is suggested. The method of the present invention includes: managing an update history on the basis of guidance information included in a map, receiving the map update information included in search information in real time, reconstructing path guidance information of a terminal, and performing exact guidance on the terminal with search path information transmitted from the server.

6 Claims, 8 Drawing Sheets

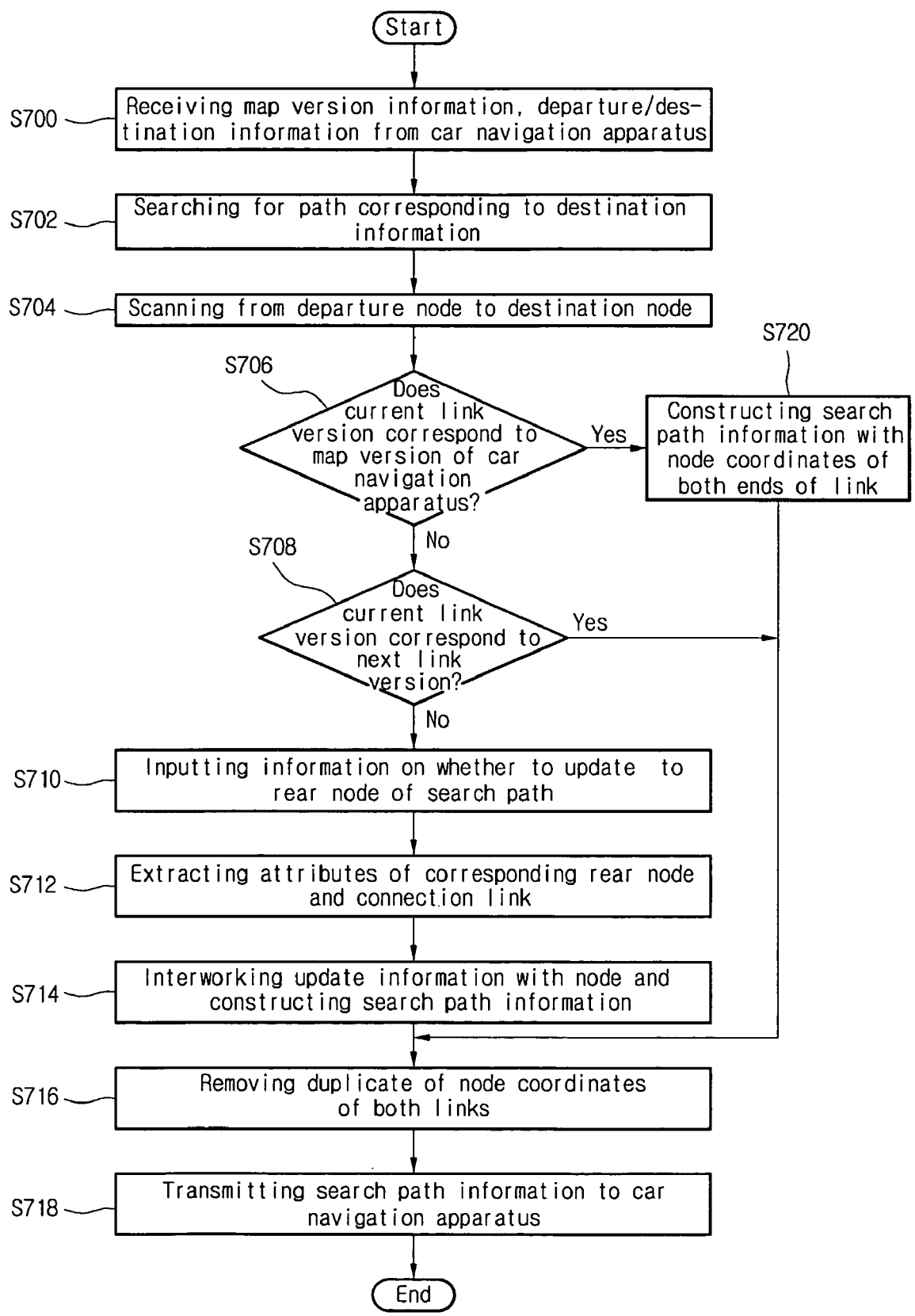

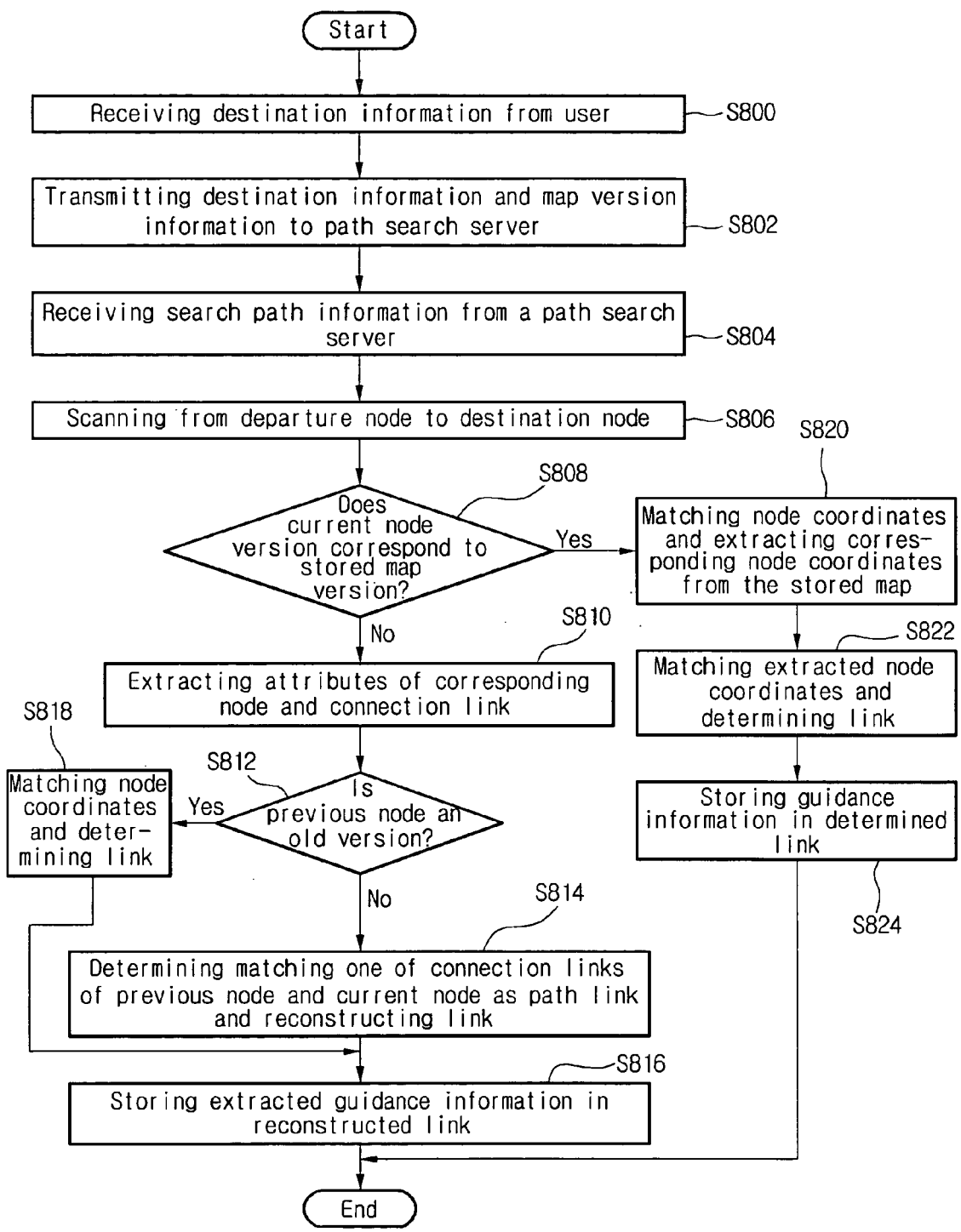

METHOD OF MAP VERSION MANAGEMENT FOR A CAR NAVIGATION SYSTEM

CROSS-REFERENCES TO RELATED APPLICATION

Pursuant to 35 U.S.C. § 119(a), this application claims the benefit of earlier filing date and right of priority to Korean Application No. 43954/2003, filed on Jun. 30, 2003, the contents of which are hereby incorporated by reference herein in their entirety.

BACKGROUND OF THE INVENTION

1. Field of the Invention

The present invention relates to a car navigation system.

2. Description of the Related Art

A car navigation apparatus has been developed that quickly and safely guides a driver to a destination and provides the driver with desired facility information and region information as additional information. The car navigation apparatus calculates a path to guide a car to the driver's destination and provides the driver with drive instructions with considering the car's current location and driving direction so as to make the car drive along the calculated path.

The above-mentioned car navigation apparatus provides a navigation function, a path calculation function, a map display function, a path guide function and a facility information function.

The navigation function is a function to frequently obtain the location of the car and inform the driver of the location when a car runs. To implement this navigation function, required are a GPS receiver, a speedometer and a gyro sensor. The speedometer informs the driver of a current location using a relative location according to movement of the car.

The map display function is a function to display roads, surrounding facilities and background so as to allow the driver to watch a displayed map and recognize his or her location. The map display function should provide a function to magnify or contract a map and quickly shift screen in eight directions of north, south, east, west, northeast, northwest, southeast and southwest.

The path calculation function is a function to find optimal path to a desired destination. The path guide function is a function to guide the driver according to an optimal path obtained from path calculation. In other words, the car navigation teaches the driver which road to go along, underground road or elevated road, and teaches the driver which direction to turn at an intersection. Also, when the car approaches an intersection, the car navigation displays a magnified map of the intersection to help the driver driving the car along exacter path. The facility information function is a function to provide the driver with information on a desired facility, for example, location of and related information on a specific facility nearest to the current driver's location. To implement this function, required is information on various facilities.

The car navigation apparatus performing such functions has map information deliberately and updates the map information in real time or by off-line. In other words, the car navigation apparatus updates the stored map information in real time through wire or wireless communication network or receives the map information from a service provider by off-line to update.

The related art method for updating the map information at the car navigation apparatus will be described in detail referring to accompanying drawings.

FIG. 1 shows a related art car navigation apparatus for updating the map information.

The related art car navigation apparatus for updating the map information includes a display unit 100, a first memory means 110 and a reproduction unit 120 as shown in FIG. 1. The display unit 100 outputs road map information. The first memory means 110 stores road map. The reproduction unit 120 reproduces road map data of the first memory means 110.

In addition, the related art car navigation apparatus further includes a car location detection sensor 130, an input unit 140 and a controller 150. The car location detection sensor 130 detects a location of a car. The input unit 140 receives a user control signal by user's manipulation. The controller 150 controls the reproduction unit 120 according to a control signal inputted from the input unit 140. Herein, the controller 150 reproduces road map data of the first memory means 110 and controls the display unit 100 to display the reproduced road map data, and also, at the same time, controls the display unit 100 to display a location of a car according to a location signal inputted from the car location detection sensor 130.

The related art car navigation apparatus further includes a receiver 160 and a second memory means 170. The receiver 160 receives road map data transmitted from a base station. The second memory means 170 can store, read and write updated road map data.

The method for updating the map information at the related art car navigation apparatus described above will be described. If the road map data received through the receiver 160 is different from the data stored in the second memory means 170, it is determined that the received road map data is new data and the newly received road map data is stored the second memory means 170. Then, the car location detection sensor 130 detects location of its car. Herein, if surrounding road map data of the location of the car is stored in the second memory means 170, it is determined that the data is updated, and then road map data is read from the second memory means 170. If the surrounding road map data of the location of the car is not stored in the second memory means 170, the road map data is read from the first memory means 110 and is outputted through the display unit 100. Accordingly, since the road map data outputted from the display unit 100 is updated and outputted whenever traffic situation is actually changed, a driver can drive safely and actual traffic situation is informed of to the driver regardless of a data update period of the first memory means 110.

According to the related art described above, however, since determination of whether the map data is updated and version management object depends on shape information of a map, an update history for the case that guidance information is changed cannot be managed.

In addition, since a map update contents management criterion is focused on map production, if the guidance information for actual guidance is changed in a car navigation apparatus, a proper response is impossible to make.

Additionally, if information is received and terminal map is updated in real time, since map update contents are generated by one time production for an entire map and the amount of updated information is enlarged, it is required to transmit a large amount of data.

In addition, in a payment system that a user is charged in unit of transmission packet, since a large amount of information is received including unnecessary information as well as a currently essential interested information, unnecessary cost is charged.

Additionally, in case that a large amount of information is updated, if the amount of the entire map exceeds an accommodating dynamic memory size, the information cannot stored.

SUMMARY OF THE INVENTION

Accordingly, the present invention is directed to a car navigation system and a map version management method thereof that substantially obviate one or more problems due to limitations and disadvantages of the related art.

An object of the present invention is to provide a car navigation system and a map version management method thereof that guide a driver exactly on a terminal by search path information transmitted from a server with suggesting a map version management method between the server and a car navigation apparatus, which store maps that are different from each other in version.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a car navigation system according to an embodiment of the present invention includes: a GPS satellite for receiving current location information of a moving object; a path search server for searching for a path corresponding to destination information inputted by a user, determining whether to update a map by checking whether versions of links in the search path corresponds to a version of a map transmitted from a car navigation apparatus, and if it is necessary to update the map, inputting update information to a rear stage of a corresponding link to transmitting a corresponding search path; and a car navigation apparatus for scanning each node of a search path transmitted from the path search server, determining whether a node where update information is inputted exists, reconstructing a link, extracting guidance information from the update information, and storing the extracted guidance information in a corresponding link.

In another aspect of the present invention, a map version management method for car navigation system including a path search server and a car navigation apparatus includes: (a) searching for a path corresponding to the received destination information, when receiving a map version information and a destination information from the car navigation apparatus; (b) determining whether a version of a current link corresponds to the map version information, with scanning from a start link to a destination link; (c) determining whether the version of the current link corresponds to a version of a next link, if the version of the current link does not correspond to the map version information; and (d) inputting updated information to a rear node of a search path to construct search path information, if the version of the current link corresponds to the version of the next link.

In another aspect of the present invention, a map version management method for car navigation system including a path search server and a car navigation apparatus includes: (a) scanning from a start node to a destination node and determining whether a version of a current node corresponds to stored map version, when receiving search path information corresponding to destination information inputted by a user; (b) extracting an attribute of a corresponding node and an attribute of a connection link, if the version of the current node does not correspond to the stored map version; (c) determining whether a version of a previous node is a new version, if the version of the previous node is the new version, determining a matching link of connection links of a previous node and a current node to be a path link and reconstructing a link; and (d) storing guidance information in the reconstructed link, the guidance information including the extracted attribute of the corresponding node and the extracted attribute of the connection link.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a flowchart showing a method of constructing search path information at the path search server according to another embodiment of the present invention; and FIG. 8 is a flowchart showing a method of constructing link with scanning from a start node to destination node at the car navigation apparatus according to another embodiment of the present invention.

DETAILED DESCRIPTION OF THE INVENTION

Reference will now be made in detail to the preferred embodiments of the present invention, examples of which are illustrated in the accompanying drawings.

Figure 1:
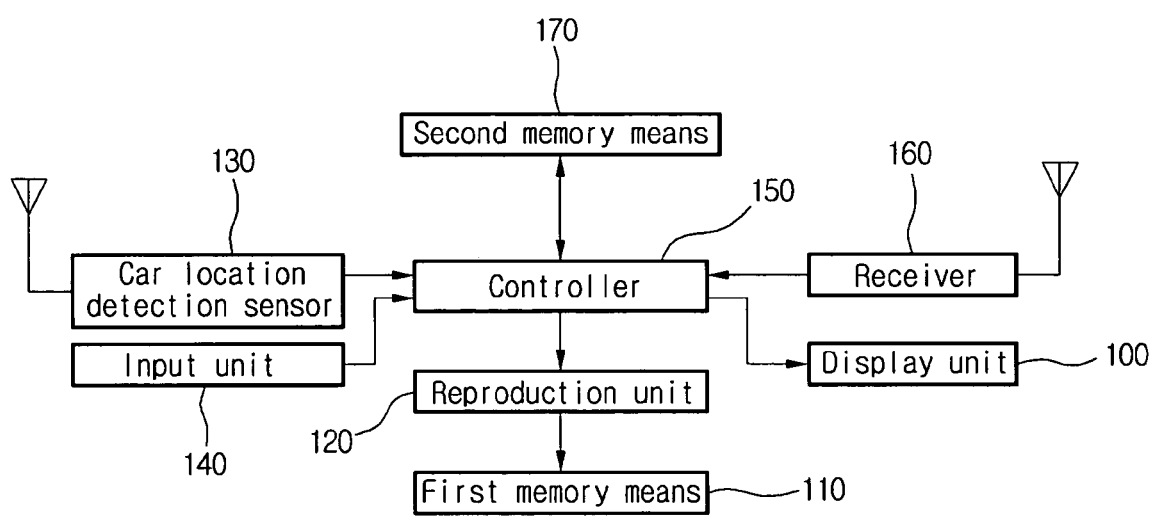
FIG. 1 shows a related art car navigation apparatus for updating the map information.
Figure 2:
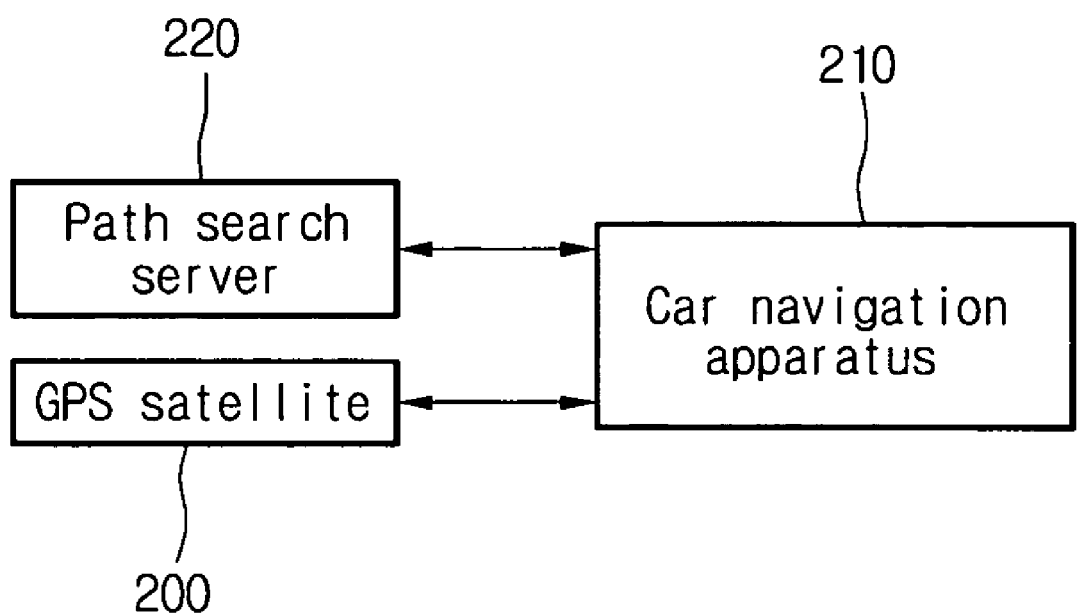
FIG. 2 shows a car navigation system according to an embodiment of the present invention.

FIG. 2 shows a car navigation system according to an embodiment of the present invention. The car navigation system includes a GPS satellite 200, a car navigation apparatus 210 and a path search server 220 as shown in FIG. 2.

The GPS satellite 200 transmits current location information of a moving object to the car navigation apparatus 210.

The car navigation apparatus 210 supplies a user with necessary real time information such as map marking, navigation functions and path guidance.

When search path information corresponding to destination information inputted by a user is transmitted to the path search server 220, the car navigation apparatus 210 determines whether a version of each node in the search path corresponds to a version of a stored map.

If the version of the node in the search path transmitted from the path search server 220 does not correspond to the version of the stored map, an attribute of a corresponding node and an attribute of a connection link are extracted and the stored map information is reconstructed using the extracted attribute of the corresponding node and the extracted attribute of the connection link.

In addition, the car navigation apparatus 210 creates guidance information corresponding to the reconstructed and stores the created guidance information. In other words, the car navigation apparatus 210 extracts path guidance information from the map update information received from the path search server 220, reconstructs a search path and changes guidance information for a changed portion of the path guidance information. The car navigation apparatus 210 corrects map matching for shape change using map update information received from the path search server 220.

The car navigation apparatus 210 has: a function of correcting display information for a screen display information update portion, a function of determining whether to deviate from a path using surround shape for a map update portion and a function of guiding to a normal path after deviation determination.

Meanwhile, the path search server 220 receives map information from a map information provider, determines whether each link of the received map information is an update object, and applying a new version to the corresponding link. In other words, the path search server 220 manages links that can interwork with shape and traffic information. If the link is an update object, a new version is applied to the corresponding link. If the node is an update object, the path search server 220 applies a new version to all the links connected to the node. If it passes a corresponding node at a link array of the search path, since the path search server 220 cannot determine which connection link the link array is arranged according to with a map before path search, the path search server 220 checks whether to update for all the connection link.

For example, if links b-c and c-d are update objects for simply connected nodes a, b, c, d, e and f, a new version is given to the links b-c and c-d. If the update object has connection links a-b, a-c and a-d for a node a, the new version is commonly given to the links a-b, a-c and a-d. If the path search server 220 receives destination information from the car navigation apparatus 210, the path search server 220 searches for a path corresponding to the destination information. Then, the path search server 220 determines whether a version of each link in the searched search path corresponds to a version of a map of the car navigation apparatus 210. If a version of each link in the searched search path does not correspond to a version of a map of the car navigation apparatus 210, information on whether to update is inputted to a rear node of a corresponding link and an attribute of the rear node of the corresponding link and an attribute of the connection link are extracted to be transmitted to the car navigation apparatus 210.

Figure 3:
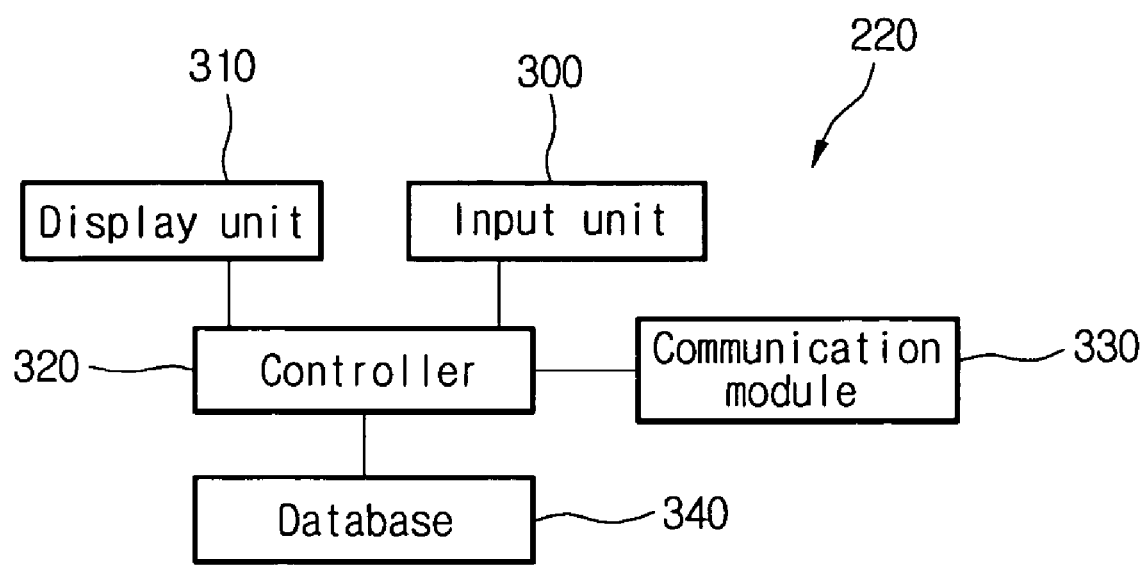
FIG. 3 shows a path search server according to another embodiment of the present invention.

FIG. 3 shows a path search server according to another embodiment of the present invention. The path search server 220 includes an input unit 300, a display unit 310, a controller 320, a communication module 330 and database 340 as shown in FIG. 3. The input unit 300 such as a keyboard is used to input information for an operator to update/search map database and manage performance, fee and a terminal. The display unit 310 displays data necessary for the operator. The controller 320 performs entire control. The communication module 330 communicates with the car navigation apparatus.

The controller 320 performs entire control according to an execution command received from the input unit 300 and provides the display unit 310 with information requested by the operator. The controller 320 extracts information requested by the car navigation system apparatus from the database 340 and transmits the extracted information through the communication module 330.

The database 340 includes electronic map database, path calculation database, facility database, and terminal and system management database. The electronic map database includes road information, background information, traffic information and administration and facility information. The road information includes a road shape and an intersection which constitutes a road. The background information includes water systems such as rivers and lakes.

The electronic map database is updated by traffic information and road information inputted by an information provider. The electronic map database is transmitted to a terminal required to update information or is used as information which an operator can confer to. The path calculation database is road network database configured so as to calculate an optimal path if information on departure and destination necessary to calculate a path is received from the car navigation apparatus. The path calculation database is made of a network including weights of a link, a node, time and distance between the link and the node.

The facility database can be provided immediately when the car navigation apparatus requests to be provided with information on a specific facility or a list of facilities near to a specific location. The facility database includes a list of facilities, detailed location information on each facility, and name and phone number of a company located in each facility. The terminal and system management database includes a subscriber terminal ID, user information, last used time of a terminal, last update time of the terminal, and server information use contents. The database 340 as described above is updated by an information provider in real time or every a predetermined time.

Figure 4:
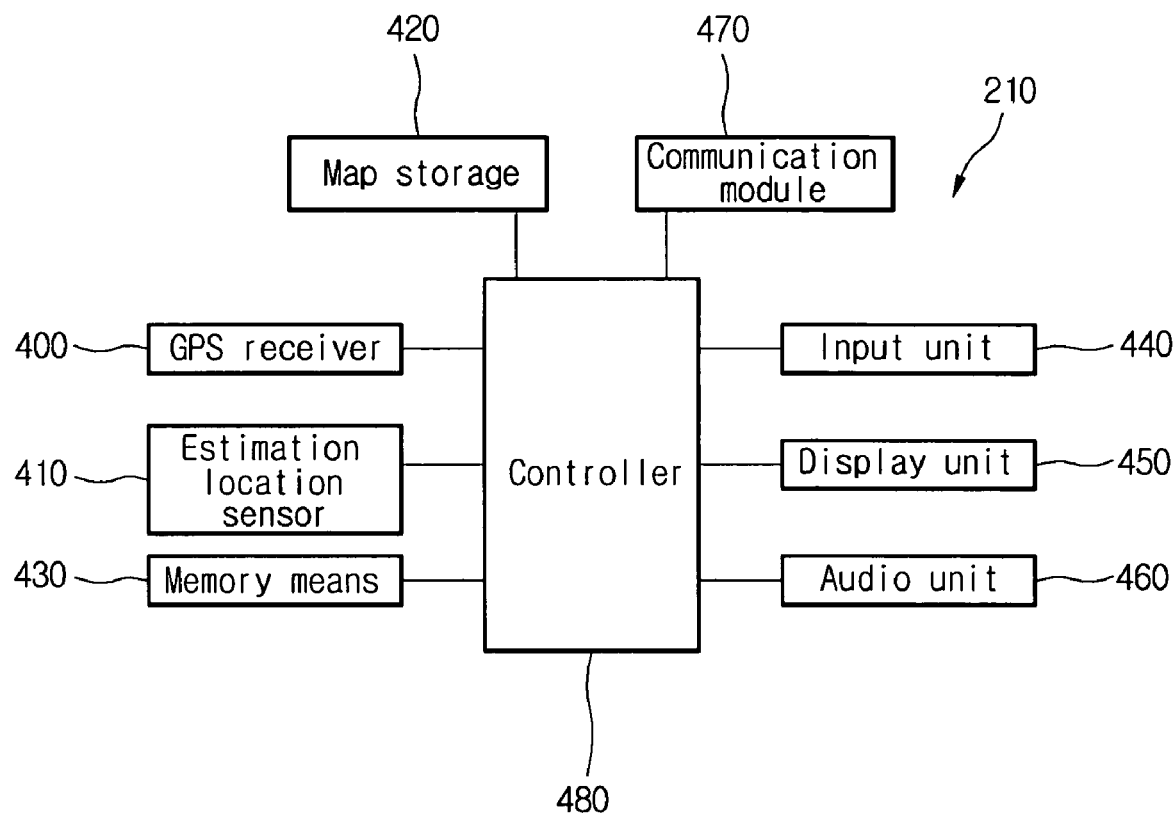
FIG. 4 shows a car navigation apparatus according to another embodiment of the present invention.

FIG. 4 shows a car navigation apparatus according to another embodiment of the present invention. The car navigation apparatus 210 according to the present invention includes a GPS receiver 400, an estimation location sensor 410 and a map storage. 420 as shown in FIG. 4. The GPS receiver 400 receives a GPS satellite signal. The estimation location sensor 410 calculates travel distance information of a moving object and travel direction information. The map storage 420 stores navigation map data.

In addition, the car navigation apparatus 210 further includes a memory means 430, an input unit 440, a display unit 450, and an audio unit 460. The memory means 430 stores temporarily data to be calculated. The input unit 440 allows a user to input a desired command. The display unit 450 displays a processed result. The audio unit 460 outputs the processed result in sound.

In addition, the car navigation apparatus 210 further includes a communication module 470 and a controller 480. The communication module 470 provides an interface to communicate with a base station. The controller 480 controls and processes the components at a center. When the controller 480 receives map update information from a path search server, the controller 480 reconstructs map information stored in the map storage 420 and reproduces guidance information according to the received map update information. The map storage 420 stores map display data, path guidance data and facility list data. Additionally, the map storage 420 stores map information and guidance information transmitted from the controller 480.

The operation of the car navigation apparatus will be described. When a user input destination information through the input unit 440, the controller 480 transmits the inputted destination information and map version information to the path search server through the communication module 470.

Then, when the controller 480 receives the search path information from the path search server through the communication module 470, the controller 480 determines whether a node to which the map update information is inputted exists while scanning the search path. As a result of determination, if a node to which the map update information is inputted exists, the controller 480 reconstructs a link according to the map update information, extracts guidance information including an attribute of a corresponding node and an attribute of a connection link, and stores the extracted attribute of the corresponding node and the extracted attribute of the connection link in a link.

Then, the reconstructed path information and the guidance information are outputted through the display unit 450 and the audio unit 460 and are stored in the map storage 420 at the same time.

Figure 5:
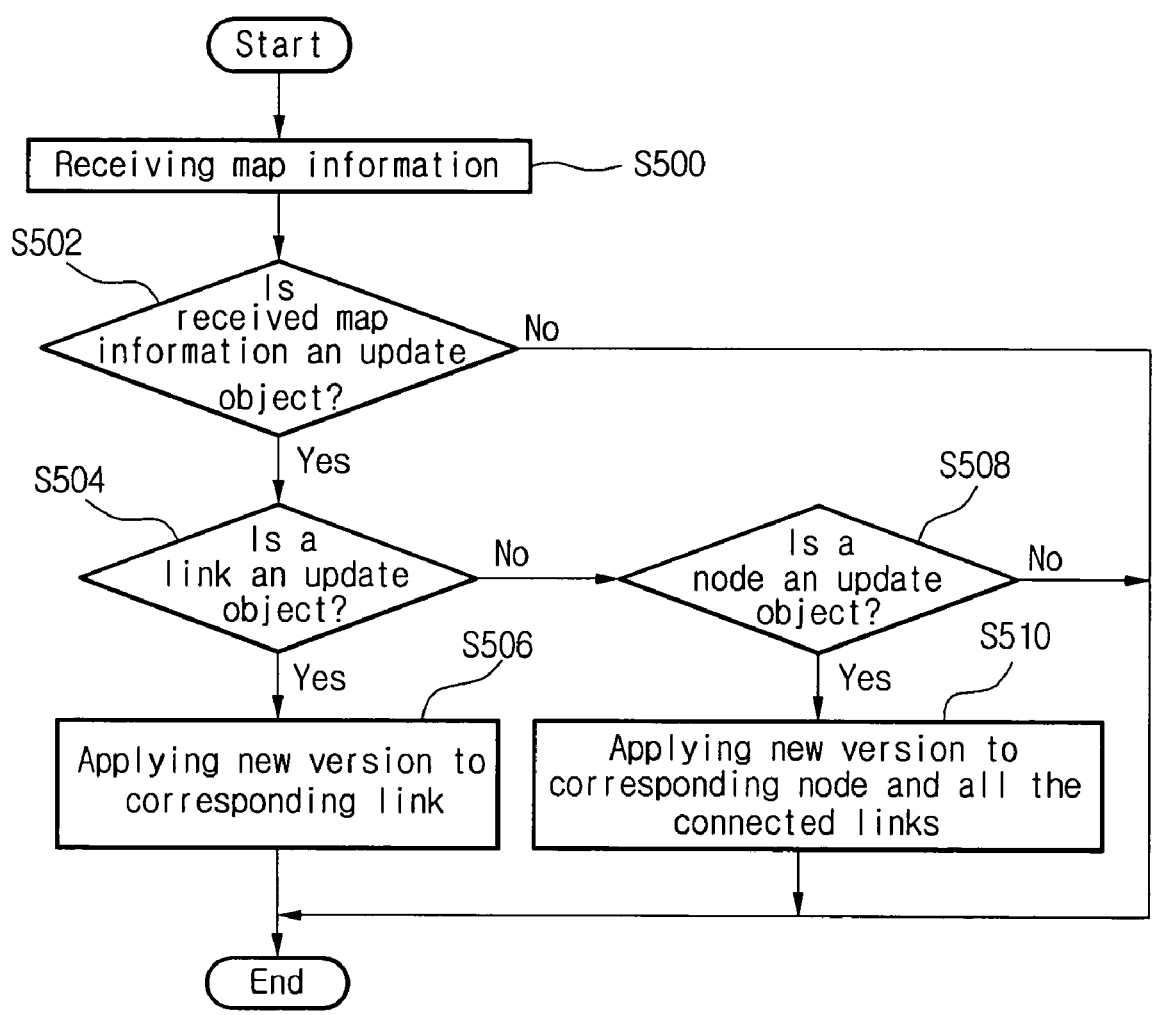
FIG. 5 is a flowchart showing a map version management method of a path search server according to another embodiment of the present invention.

Then, referring to FIG. 5, a map version management method of a path search server according to another embodiment of the present invention will be described. FIG. 5 is a flowchart showing a map version management method of a path search server according to another embodiment of the present invention. Referring to FIG. 5, when the path search server according to the present invention receives map information (S500), it is determined whether the received map information is an update object (S502). In other words, the path search server determines whether the received map information is an update object, using size of update information, node coordinate matching range, node sequence inversion tolerance of the search path, map matching error tolerance range of existing shape of path guidance and change of information type.

As the result of determination at the step S502, if the received map information is the update object, the path search server determines whether the link is an update object (S504). As the result of determination at the step S504, if the link is the update object, the path search server determines whether a new version is applied to a corresponding link (S506). For example, if the links b-c and c-d are update objects for the simply connected nodes a, b, c, d, e and f, the new version is given to the links b-c and c-d. As the result of determination at the step S504, if the link is not the update object, the path search server determines whether the node is an update object (S508).

Figure 6:
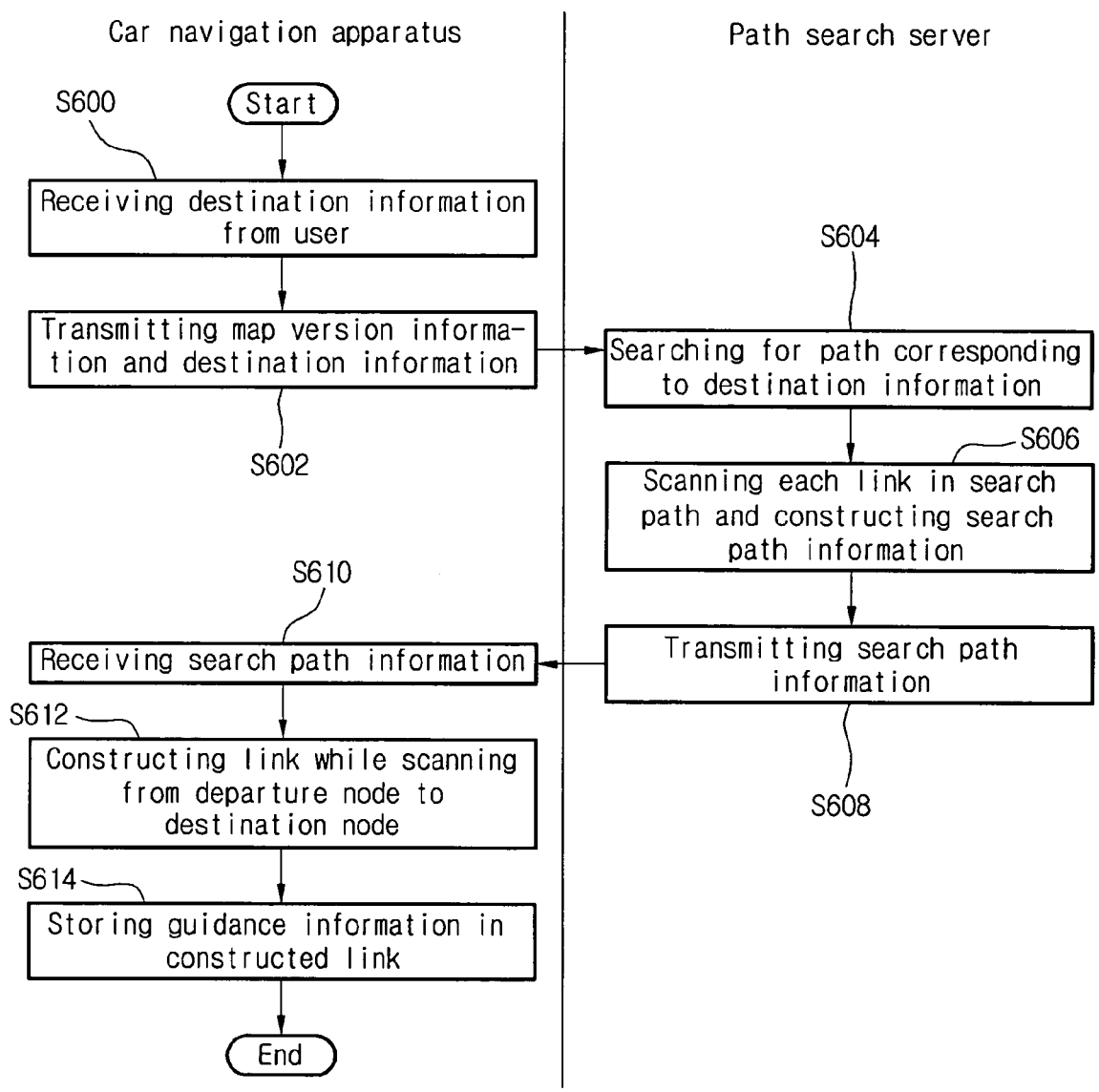
FIG. 6 is a flowchart showing a real time map updating method according to another embodiment of the present invention.

As the result of determination at the step S508, if the node is the update object, the path search server applies a new version to the corresponding node and all the connected links (S510). For example, when the update object has connection links a-b, a-c and a-d for the node a, the new version is commonly applied to the links a-b, a-c and a-d. Then, a map updating method according to another embodiment of the present invention A map updating method of a car navigation system according to another embodiment of the present invention will be described referring to FIG. 6. FIG. 6 is a flowchart showing a real time map updating method according to another embodiment of the present invention. When the car navigation apparatus receives destination information from a user (S600), the car navigation apparatus transmits the received destination information and map version information to the path search server (S602).

Then, the path search server searches for a path corresponding to destination information transmitted from the car navigation apparatus (S604). Then, the path search server scans each link in the search path and constructs search path information (S606). The path search server transmits the search path information to the car navigation apparatus (S608). The method in which the path search server constructs search path information will be described later referring to FIG. 7.

When the step S608 is performed, the car navigation apparatus receives search path information (S610), and then constructs link while scanning from the departure node to the destination node (S612). The method of constructing link while scanning from the departure node to the destination node will be described later referring to FIG. 8. When the step S610 is performed, the car navigation apparatus creates and stores the guidance information according to the constructed link. The guidance information includes screen display surrounding shape, path guidance indexing information and path deviation determination information.

Then, referring to FIG. 7, a method of constructing search path information at the path search server will be described. FIG. 7 is a flowchart showing a method of constructing search path information at the path search server according to another embodiment of the present invention.

When the path search server according to the present invention receives map version information and departure/destination information from the car navigation apparatus (S700), the path search server searches for a path corresponding to the received destination information as shown in FIG. 7 (S702).

After the step S702 is performed, the path search server scans from the departure link to the destination link of the search path (S704), and determines whether a current link version corresponds to a map version of the car navigation apparatus (S706).

As a result of the step S706, if the current link version does not correspond to a map version of the car navigation apparatus, the path search server determines whether the current link version corresponds to a next link version (S708).

As a result of the step S708, if the current link version does not correspond to the next link version, the path search server inputs information on whether to update to a rear node of the search path (S710), and extracts an attribute of the extracted rear node and an attribute of the connection link (S712). The attribute of the extracted rear node and the attribute of the connection link are transmitted so as to create guidance information on a map update portion, and include a node type, a node name, connection link shape, road type, link type, traffic regulation, facilities on a road, the number of lanes, width of a road, a road name, routing number and surrounding road shape of intersection of road dense region.

After the step S712 is performed, the path search server communicates the inputted information on whether to update and update information with a node to construct search path information (S714). The update information includes the attribute of the extracted corresponding rear node and the attribute of the connection link. In other words, if the version information on an independent link is changed, the car navigation apparatus index update information to a rear node of a path search result node sequence so as to determine whether to update on the basis of entrance link to a transmission node. For example, if links b-c and c-d are update objects for successive nodes a, b, c, d, e and f, only c of the nodes which the path search server transmits is indexed as an update object.

In addition, if link d-e is an update object for the successive nodes a, b, c, d, e and f, only e of the nodes which the path search server transmits is indexed as an update object. Then, the path search server removes duplicate of node coordinates of both ends of a link (S716). The search path information is transmitted to the car navigation apparatus (S718). As a result of the step S706, if the current link version corresponds to the map version of the car navigation apparatus, the path search server constructs search path information from node coordinates of both ends of the link (S720) and performs the step S716.

Then, referring to FIG. 8, a method of constructing a link at the car navigation apparatus will be described. FIG. 8 is a flowchart showing a method of constructing link with scanning from a start node to destination node at the car navigation apparatus according to another embodiment of the present invention.

When the car navigation apparatus according to the present invention receives destination information from a user (S800), the car navigation apparatus transmits the received destination information and map version information to the path search server (S302) as shown in FIG. 8. The path search server searches for a path corresponding to the destination information and transmits the search path information to the car navigation apparatus.

When the car navigation apparatus receives search path information from the path search server (S804), the car navigation apparatus scans from the departure link to the destination link (S806), and determines whether a current node version corresponds to a stored map version (S808). In other words, the car navigation apparatus determines whether the current node includes update information inputted from the path search server.

As a result of the step S808, if the current node version does not correspond to the stored map version, the car navigation apparatus extracts an attribute of the current node and an attribute of a connection link (S810). In other words, car navigation apparatus extracts the attribute of the current node and the attribute of the connection link from the update information if the current node includes update information. Then, the car navigation apparatus determines whether a previous node of the current node is old version (S812).

As a result of the step S812, if the previous node of the current node is not the old version, the car navigation apparatus determines a matching one of connection links of the previous node and the current node as a path link and reconstructs a link (S814). After performing the step S814, the car navigation apparatus stores the extracted guidance information in the reconstructed link (S816). The guidance information includes an attribute of the extracted node and an attribute of the connection link.

As a result of the step S812, if the previous node of the current node is the old version, the car navigation apparatus matches node coordinates and determines a link (S818). Then, the step S816 is performed. As a result of the step S808, if the current node version corresponds to the stored map version, the car navigation apparatus matches node coordinates and extracts corresponding node coordinates from the stored map (S820).

After the step S820 is performed, the car navigation apparatus matches the extracted node coordinates and determines a link (S822). The car navigation apparatus stores guidance information in the determined link (S824).

According to the present invention described above, since information for guide is used besides map shape, if information necessary for normal path guidance includes update information, the car navigation apparatus can receive the update information and use for guidance, so that quality of user provision service can be improved.

According to the present invention described above, since information on whether to update a map is given to a link, a server can easily check whether a map-updated link is included in a search path, and a terminal receives a node to determine the link and whether to update the map.

According to the present invention described above, since map update contents are not used in a terminal map in real time but only the information required to guide is extracted and transmitted through communication connection between a server and a terminal, the overhead in which all the information including the information that is not required for the current guidance should be received can be avoided.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A map version management method for car navigation system comprising a path search server and a car navigation apparatus, the method comprising:
    (a) searching for a path corresponding to the received destination information, when receiving a map version information and a destination information from the car navigation apparatus;
    (b) determining whether a version of a current link corresponds to the map version information, with scanning from a start link to a destination link;
    (c) determining whether the version of the current link corresponds to a version of a next link, when the version of the current link does not correspond to the map version information; and
    (d) inputting update information to a rear node of a search path to construct search path information, when the version of the current link corresponds to the version of the next link and does not correspond to the map version information.

2. The method according to claim 1, wherein the step (b) further comprises:
    constructing a search path with node coordinates on both ends of the corresponding link, if the version of the current link corresponds to the map version information.

3. A map version management method for car navigation system comprising a path search server and a car navigation apparatus, the method comprising:
    (a) scanning from a start node to a destination node and determining whether a version of a current node corresponds to stored map version, when receiving search path information corresponding to destination information inputted by a user;
    (b) extracting an attribute of a corresponding node and an attribute of a connection link, when the version of the current node does not correspond to the stored map version;

(c) determining whether a version of a previous node is a new version, determining a matching link of connection links of the previous node and the current node as a path link when the version of the previous node is the new version, and reconstructing a link; and (d) storing guidance information in the reconstructed link, the guidance information comprising the extracted attribute of the corresponding node and the extracted attribute of the connection link.

4. The method according to claim 3, further comprising:

(e) if the version of the current node corresponds to the stored map version at the step (a), matching node coordinates with the stored map and extracting corresponding nodes; and (f) after matching the extracted node coordinates and determining a link, storing guidance information in the determined link.

5. The method according to claim 3, wherein, if a version of the previous node is an old version, matching node coordinates, determining a link and storing the guidance information in the determined link.

6. The method according to claim 3, wherein in the step (a), it is determined whether update information inputted from the path search server is included in the current node.

* * * * *